United States Patent
Hsieh

(10) Patent No.: US 9,152,583 B2
(45) Date of Patent: Oct. 6, 2015

(54) METHOD FOR OPERATING FLASH MEMORIES ON A BUS

(75) Inventor: Ming-Hung Hsieh, Kaohsiung (TW)

(73) Assignee: Etron Technology, Inc., Hsinchu (TW)

( * ) Notice: Subject to any disclaimer, the term of this patent is extended or adjusted under 35 U.S.C. 154(b) by 479 days.

(21) Appl. No.: 13/087,361

(22) Filed: Apr. 14, 2011

(65) Prior Publication Data

US 2012/0151122 A1 Jun. 14, 2012

(30) Foreign Application Priority Data

Dec. 8, 2010 (TW) .............................. 099142796 A

(51) Int. Cl.
*G06F 12/00* (2006.01)
*G06F 13/16* (2006.01)
*G06F 12/02* (2006.01)

(52) U.S. Cl.
CPC ............ *G06F 13/16* (2013.01); *G06F 12/0246* (2013.01)

(58) Field of Classification Search
CPC ........................... G06F 12/0246; H04L 47/10
USPC ........................................................ 711/103
IPC .................................................. G06F 12/0246
See application file for complete search history.

(56) References Cited

U.S. PATENT DOCUMENTS

| 5,920,884 A * | 7/1999 | Jennings et al. ............... 711/102 |
| 7,606,992 B1 * | 10/2009 | Karabatsos ................... 711/170 |
| 2006/0023554 A1 | 2/2006 | Matsushita |
| 2007/0245061 A1 | 10/2007 | Harriman |
| 2010/0250793 A1 * | 9/2010 | Syu ................................ 710/29 |

FOREIGN PATENT DOCUMENTS

TW 200807240 2/2008

* cited by examiner

*Primary Examiner* — Aimee Li
*Assistant Examiner* — Trang Ta
(74) *Attorney, Agent, or Firm* — Winston Hsu; Scott Margo

(57) ABSTRACT

Enable a read command of a first flash memory. After the read command of the first flash memory is enabled, a ready/busy signal of the first flash memory enters a busy waiting time, and a read command of a second flash memory starts to be enabled. Start to read data of the first flash memory when the busy waiting time is over. Enable the read command of the first flash memory again upon completion of reading the data of the first flash memory. Start to read data of the second flash memory after the read command of the first flash memory is enabled again. And enable the read command of the second flash memory again upon completion of reading the data of the second flash.

11 Claims, 4 Drawing Sheets

METHOD FOR OPERATING FLASH MEMORIES ON A BUS

BACKGROUND OF THE INVENTION

1. Field of the Invention

The present invention is related to a method for operating flash memories, and particularly to a method for operating two flash memories on a bus.

2. Description of the Prior Art

Please refer to FIG. 1. FIG. 1 is a timing diagram illustrating a ready/busy signal R/B, a read enabling signal RE, and a chip enabling signal CE when a host reads a flash memory. As shown in FIG. 1, when a read command of the flash memory is enabled, the ready/busy signal R/B enters a busy waiting time T2. The host starts to toggle the read enabling signal RE when the busy waiting time T2 is over. The host reads data of the flash memory according to a data storing address included by the read command once each time the read enabling signal RE is toggled. When the host starts to toggle the read enabling signal RE, a chip enabling signal CE of the flash memory is changed from high to low. In addition, in an operation specification of a flash memory, a time interval T3 of reading data is longer than the busy waiting time T2, and the busy waiting time T2 is longer than a time interval T1 of the read command.

Please refer to FIG. 2. FIG. 2 is a timing diagram illustrating the host utilizing a time interval of the busy waiting time to read two flash memories simultaneously according to the prior art. As shown in FIG. 2, when a read command A corresponding to a first flash memory on a bus ends, a ready/busy signal ch0AR/B corresponding to the first flash memory enters a busy waiting time BWT1, so that the host can utilize a time interval of the busy waiting time BWT1 to enable a read command B corresponding to a second flash memory. When the busy waiting time BWT1 ends, the host starts to read data F1Data stored in the first flash memory. When the host finishes reading the data F1Data stored in the first flash memory, a time interval of a busy waiting time BWT2 corresponding to the second flash memory also ends, so that the host can immediately start reading data F2Data stored in the second flash memory. The host can enable the read command A of the first flash memory again upon completion of reading the data F2Data stored in the second flash memory. Thus, the host can operate two flash memories on a bus by repeating the above mentioned steps.

However, as shown in FIG. 2, data transmitted on the bus are not compact; that is to say, the bus has some idle time. Therefore, operation efficiency of the prior art does not achieve the best efficiency for operating two flash memories on a bus.

SUMMARY OF THE INVENTION

The present invention provides a method for operating flash memories on a bus. The method includes enabling a read command of a first flash memory for a ready/busy signal of the first flash memory to enter a busy waiting time; enabling a read command of a second flash memory after the read command of the first flash memory is enabled; starting to read data of the first flash memory when the busy waiting time is over; enabling the read command of the first flash memory again upon completion of reading the data of the first flash memory; starting to read data of the second flash memory after the read command of the first flash memory is enabled again; enabling the read command of the second flash memory again upon completion of reading the data of the second flash memory.

The present invention provides a method for operating flash memories on a bus. Sequence of operation for flash memories on the bus is enabling the read command of the first flash memory, enabling the read command of the second flash memory, reading the data of the first flash memory, enabling the read command of the first flash memory, reading the data of the second flash memory, enabling the read command of the second flash memory, reading the data of the first flash memory, enabling the read command of the first flash memory, and so on. Only at the beginning of the sequence of the operation for the flash memories are enabling the read command of the first flash memory and enabling the read command of the second flash memory performed together, then the present invention repeats steps of reading the data of the first flash memory, enabling the read command of the first flash memory, reading the data of the second flash memory, and enabling the read command of the second flash memory. Therefore, in the present invention, data transmitted on the bus are more compact and efficient than the prior art.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
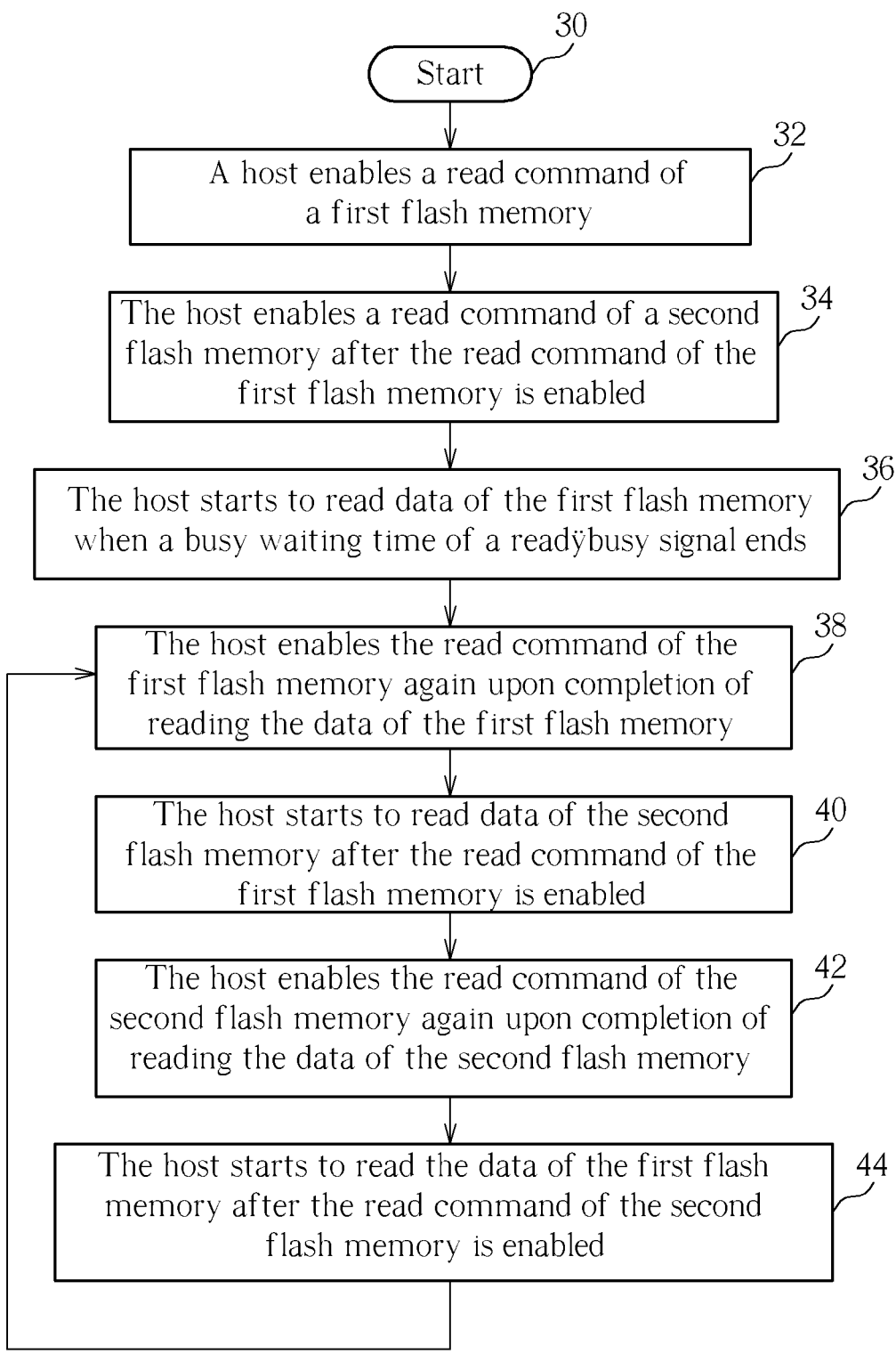
FIG. 3 is a flowchart illustrating a method for operating flash memories on a bus according to an embodiment.
Figure 4:
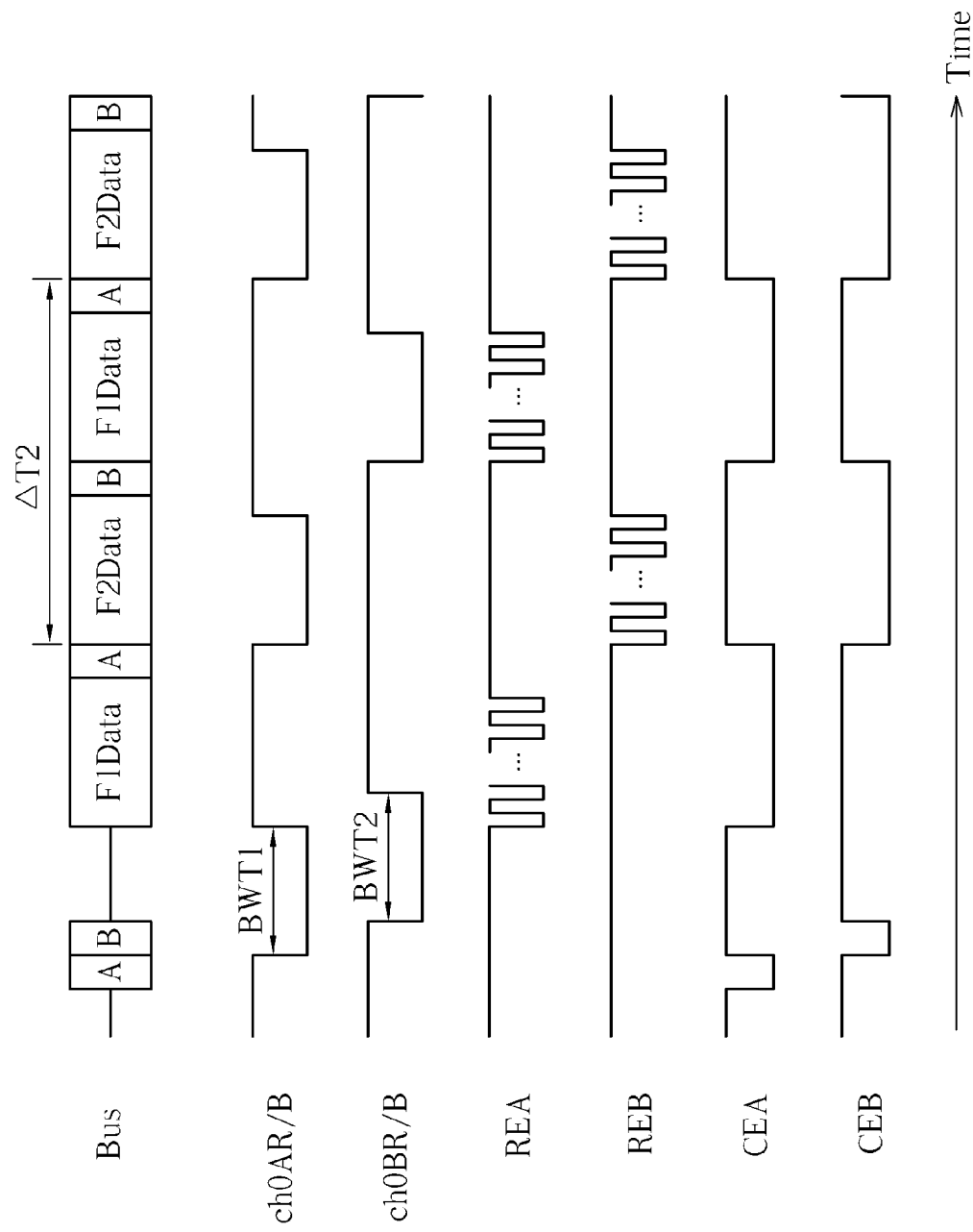
FIG. 4 is a timing diagram of the method shown in FIG. 3.

Please refer to FIG. 3 and FIG. 4. FIG. 3 is a flowchart illustrating a method for operating flash memories on a bus according to an embodiment, and FIG. 4 is a timing diagram of the method shown in FIG. 3. Detailed steps of the method shown in FIG. 3 are as follows:

Step 30: Start.

Step 32: A host enables a read command A of a first flash memory.

Step 34: The host enables a read command B of a second flash memory after the read command A of the first flash memory is enabled.

Step 36: The host starts to read data F1Data of the first flash memory when a busy waiting time BWT1 of a ready/busy signal ch0AR/B ends.

Step 38: The host enables the read command A of the first flash memory again upon completion of reading the data F1Data of the first flash memory.

Step 40: The host starts to read data F2Data of the second flash memory after the read command A of the first flash memory is enabled.

Step 42: The host enables the read command B of the second flash memory again upon completion of reading the data F2Data of the second flash memory.

Step 44: The host starts to read the data F1Data of the first flash memory after the read command B of the second flash memory is enabled; go to Step 38.

In Step 34, the host can enable the read command B of the second flash memory when the read command A of the first flash memory is enabled, or enable the read command B of the second flash memory after the read command A of the first flash memory is enabled for a predetermined time. In the present invention, only a busy waiting time BWT2 of a ready/busy signal ch0BR/B ends before the read command A of the first flash memory is enabled again. In Step 36, the host reads the data F1Data of the first flash memory according to a data storing address included by the read command A of the first flash memory, and reads the data F1Data corresponding to the data storing address of the first flash memory once each time a first read enabling signal REA is toggled. In Step 40, the host reads the data F2Data of the second flash memory according to a data storing address included by the read command B of the second flash memory, and reads the data F2Data corresponding to the data storing address of the second flash memory once each time a second read enabling signal REB is toggled. In addition, when the host reads the data F1Data of the first flash memory, a chip enabling signal CEA of the first flash memory is changed from high to low, so that the host only reads the first flash memory; when the host reads the data F2Data of the second flash memory, a chip enabling signal CEB of the second flash memory is changed from high to low, so that the host only reads the second flash memory. In addition, the first flash memory and the second flash memory share a bus.

Figure 1:
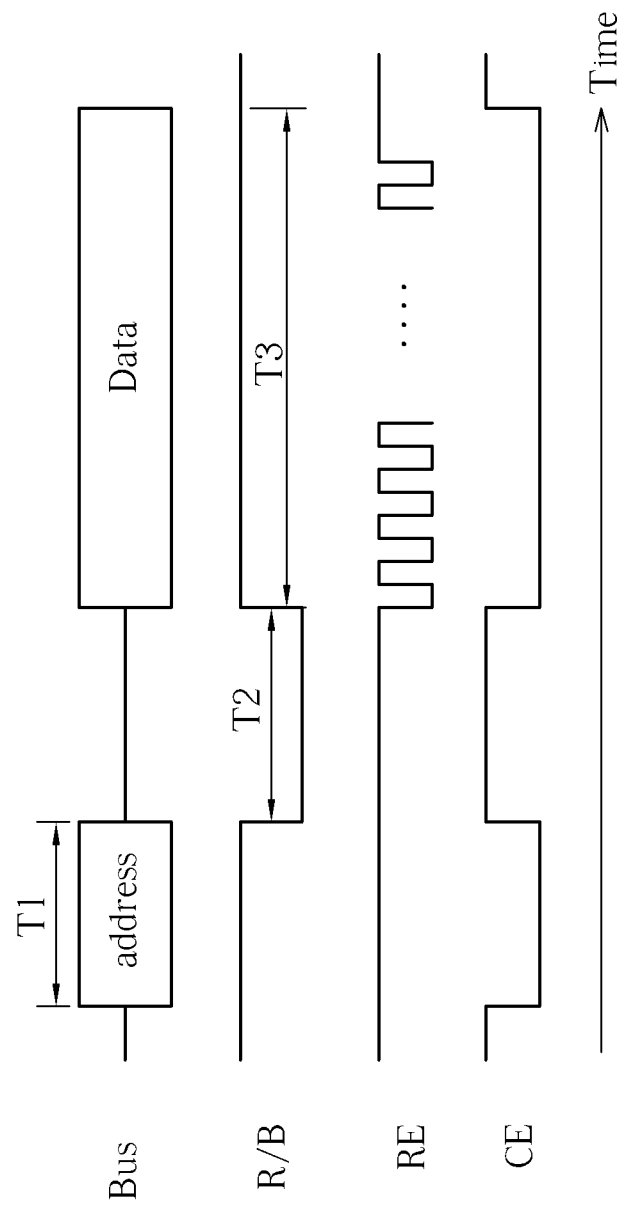
FIG. 1 is a timing diagram illustrating a ready/busy signal, a read enabling signal, and a chip enabling signal when a host reads a flash memory.
Figure 2:
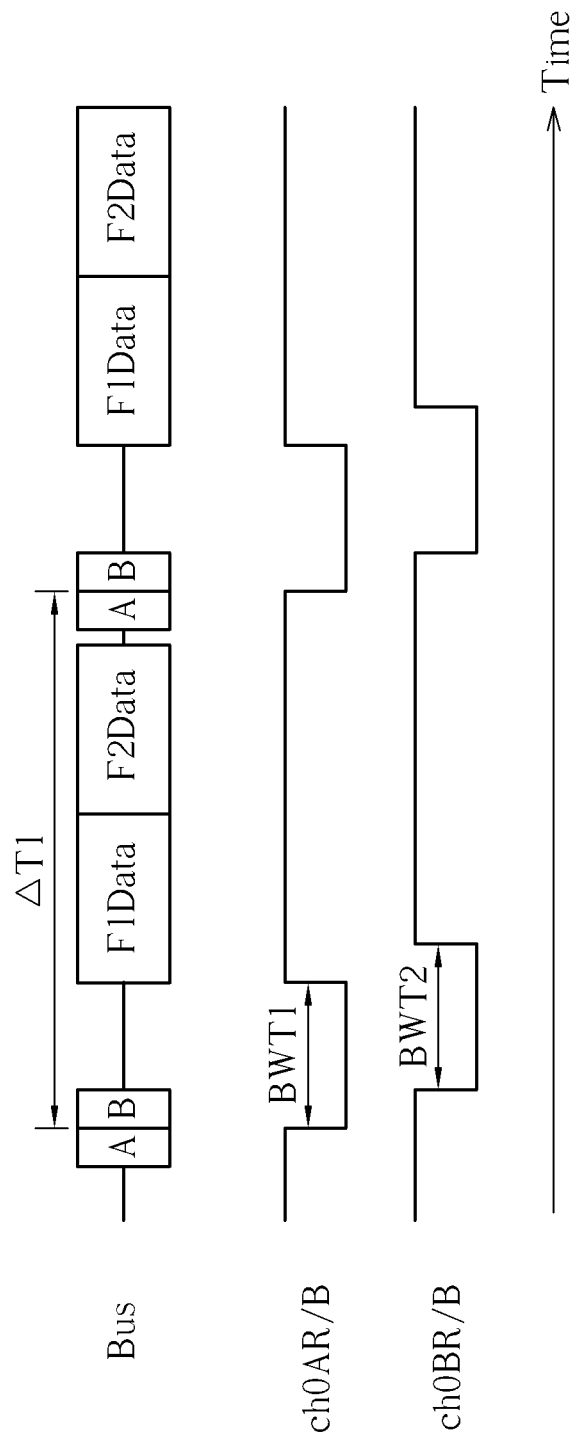
FIG. 2 is a timing diagram illustrating the host utilizing a time interval of the busy waiting time to read two flash memories simultaneously according to the prior art.

To sum up, the present invention utilizes a time interval of the busy waiting time to operate flash memories like the prior art, but a difference between the prior art and the present invention is that sequence of operation for flash memories of the present invention is enabling the read command of the first flash memory, enabling the read command of the second flash memory, reading the data of the first flash memory, enabling the read command of the first flash memory, reading the data of the second flash memory, enabling the read command of the second flash memory, reading the data of the first flash memory, enabling the read command of the first flash memory, and so on. Only at the beginning of the sequence of operation for the flash memories are enabling the read command of the first flash memory and enabling the read command of the second flash memory performed together, then the present invention repeats steps of reading the data of the first flash memory, enabling the read command of the first flash memory, reading the data of the second flash memory, and enabling the read command of the second flash memory. Therefore, in the present invention, data transmitted on the bus are more compact and efficient than the prior art. That is to say, a period αT2 (shown in FIG. 4) of operation for flash memories of the present invention is shorter than a period αT1 (shown in FIG. 2) of operation for flash memories of the prior art.

Those skilled in the art will readily observe that numerous modifications and alterations of the device and method may be made while retaining the teachings of the invention.

What is claimed is:

1. A method for operating flash memories on a bus, the method comprising:
enabling a read command of a first flash memory for a ready/busy signal of the first flash memory to enter a busy waiting time of the first flash memory;
enabling a read command of a second flash memory after the read command of the first flash memory is enabled for a ready/busy signal of the second flash memory to enter a busy waiting time of the second flash memory;
starting to read data of the first flash memory when the busy waiting time of the first flash memory is over;
directly enabling the read command of the first flash memory again after completion of reading the data of the first flash memory;
directly starting to read data of the second flash memory after the read command of the first flash memory is enabled again, wherein a time for reading the data of the second flash memory overlaps the busy waiting time of the first flash memory; and
directly enabling the read command of the second flash memory again after completion of reading the data of the second flash memory;
wherein the data of the first flash memory, the read command of the first flash memory, the data of the second flash memory, and the read command of the second flash memory are operated on the bus according to sequence of the data of the first flash memory, the read command of the first flash memory, the data of the second flash memory, and the read command of the second flash memory after the read command of the first flash memory and the read command of the second flash memory are enabled first time;
wherein a time for reading the data of the first flash memory overlaps the busy waiting time of the second flash memory.

2. The method of claim 1, further comprising:
directly starting to read the data of the first flash memory after the read command of the second flash memory is enabled again.

3. The method of claim 1, wherein enabling the read command of the second flash memory after the read command of the first flash memory is enabled is enabling the read command of the second flash memory when the read command of the first flash memory is enabled.

4. The method of claim 1, wherein enabling the read command of the second flash memory after the read command of the first flash memory is enabled is enabling the read command of the second flash memory after the read command of the first flash memory is enabled for a period of time.

5. The method of claim 1, wherein the read command of the first flash memory further comprises a data storing address of the first flash memory.

6. The method of claim 5, wherein reading the data of the first flash memory is reading the data corresponding to data storing address of the first flash memory according to the data storing address of the first flash memory.

7. The method of claim 1, wherein the read command of the second flash memory further comprises a data storing address of the second flash memory.

8. The method of claim 7, wherein reading the data of the second flash memory is reading the data corresponding to the data storing address of the second flash memory according to the data storing address of the second flash memory.

9. The method of claim 1, wherein the first flash memory and the second flash memory share a bus.

10. The method of claim 1, further comprising:
toggling a first read enabling signal of the first flash memory when the data of the first flash memory is read; and
reading data corresponding to a data storing address of the first flash memory once each time the first read enabling signal is toggled.

11. The method of claim 1, further comprising:
toggling a second read enabling signal of the second flash memory when the data of the second flash memory is read; and
reading data corresponding to a data storing address of the second flash memory once each time the second read enabling signal is toggled.

* * * * *